United States Patent [19]
Ueda

[11] Patent Number: 5,241,651
[45] Date of Patent: Aug. 31, 1993

[54] OPERATING METHOD AND ADJUSTING DEVICE IN FUZZY CONTROL APPARATUS

[75] Inventor: Tamio Ueda, Kyoto, Japan

[73] Assignee: Omron Corporation, Kyoto, Japan

[21] Appl. No.: 613,698

[22] PCT Filed: Jul. 12, 1989

[86] PCT No.: PCT/JP89/00701
§ 371 Date: Nov. 23, 1990
§ 102(e) Date: Nov. 23, 1990

[87] PCT Pub. No.: WO90/01183
PCT Pub. Date: Feb. 8, 1990

[30] Foreign Application Priority Data
Jul. 28, 1988 [JP] Japan .................. 63-186783
Oct. 18, 1988 [JP] Japan .................. 63-260429

[51] Int. Cl.$^5$ ............................ G05B 13/02
[52] U.S. Cl. ........................ 395/61; 364/149; 395/900; 395/906
[58] Field of Search ............... 364/513, 807, 148, 151, 364/149; 395/3, 900, 906, 61

[56] References Cited

U.S. PATENT DOCUMENTS 4,646,226 2/1987 Moon .................. 364/176
5,038,269 8/1991 Grimble et al. .......... 364/148

OTHER PUBLICATIONS

Larsen, P. M., "Industrial Applications of Fuzzy Logic Control", Intl. J. Man-Machine Studies, 1980, 3-10.
Sarture et al., "Performance Criteria in Adaptive Control", in Adaptive Control Systems, The Macmillan Co., 1963, 1-10.

Primary Examiner—Michael R. Fleming
Assistant Examiner—Robert W. Downs
Attorney, Agent, or Firm—Dickstein, Shapiro & Morin

[57] ABSTRACT

In a fuzzy control apparatus, characteristic data which identify a controlled system are measured, and substantial adjustment or correction of a membership function, which includes adjustment of tuning parameters, is performed automatically based on the characteristic data. As a result, the load upon the operator at the time of adjustment is alleviated and it is possible to readily deal with various controlled systems. The invention therefore excels in universality.

8 Claims, 6 Drawing Sheets

Fig.2

| e \ Δe | NL | NM | NS | ZR | PS | PM | PL |
|---|---|---|---|---|---|---|---|
| NL |  |  |  | PL |  |  |  |
| NM |  |  | PL | PM | PS |  |  |
| NS |  | PL | PM | PS | ZR | NS | NM |
| ZR | PL | PM | PS | ZR | NS | NM | NL |
| PS | PS | ZR | NS | NM | NL |  |  |
| PM |  |  | NS | NM | NL |  |  |
| PL |  |  | NM | NL |  |  |  |

OPERATING METHOD AND ADJUSTING DEVICE IN FUZZY CONTROL APPARATUS

TECHNICAL FIELD

This invention relates to an operating method in a fuzzy control apparatus and to an adjusting device thereof. More particularly, the invention relates to a method of operating a fuzzy control apparatus and to a device for adjusting the apparatus, wherein the fuzzy control apparatus presets plural types of membership functions with regard to respective ones of at least one type of input, which is derived based on a controlled variable obtained from a controlled system, and an output relating to a manipulated variable applied to the controlled system, and derives the output by performing a fuzzy inferential operation in accordance with predetermined control rules using the input and several of the set membership functions.

BACKGROUND ART

By employing a skilled operator's experience and intuition in the form of rules, a fuzzy control apparatus seeks to control a process that cannot be controlled well by a conventional PID control apparatus.

A fuzzy control apparatus is based on fuzzy theory. Fuzzy theory seeks to realize artificial intelligence and robotics by formalizing sophisticated human thought and quantitative methods of judgment and then incorporating these in a computer.

Figure 1:
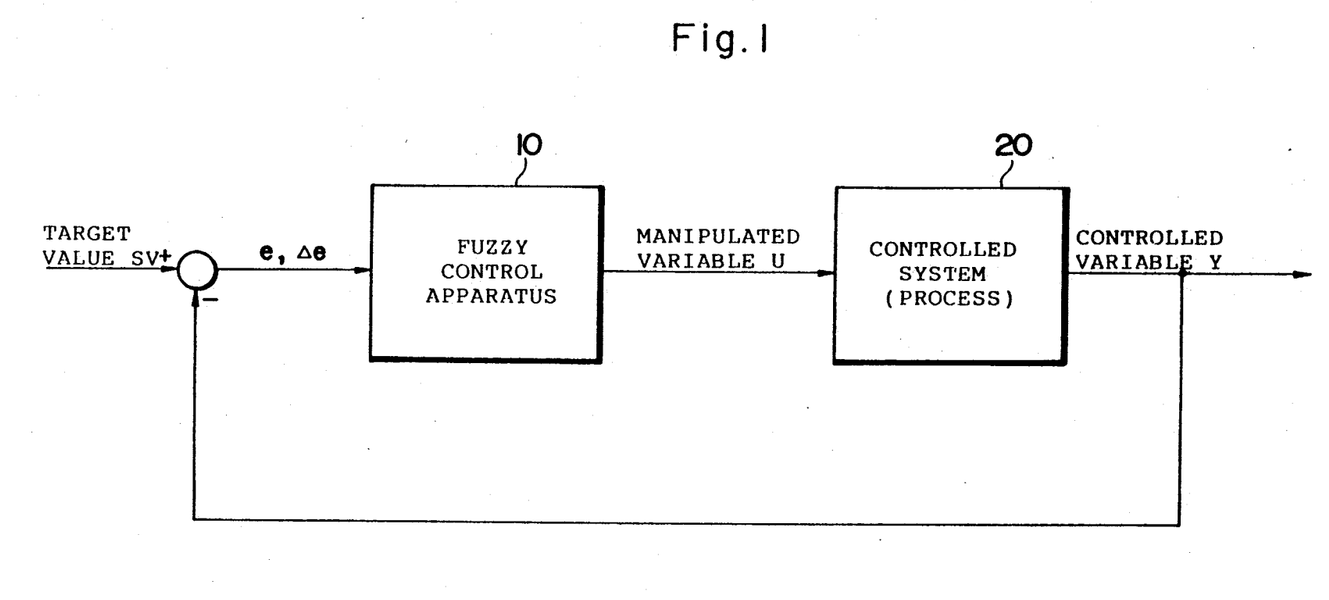
FIG. 1 is a block diagram illustrating the concept of a fuzzy control system.

FIG. 1 illustrates a control system using a fuzzy control apparatus. A fuzzy control apparatus 10 calculates a manipulated-variable output U based on an error e between a controlled variable Y, which is obtained from a controlled system (process) 20, and a prescribed set value (target value) SV, and a rate of change $\Delta e$ in the error (in case of control based on sampled values, the difference between an error $e_n$ of a present sampling and an error $e_{n-1}$ of the immediately preceding sampling). The output U is supplied to the controlled system 20.

Using membership functions relating to errors and rates of change thereof defined beforehand in rules, the fuzzy control apparatus 10 judges the conformity of the error e and rate of change $\Delta e$ thereof to the rules. In accordance with the degree of conformity, the apparatus obtains inferential results based on membership functions relating to a manipulated variable similarly defined for every rule, computes the center of gravity of these inferential results and outputs the center of gravity as a manipulated variable.

Figure 2:
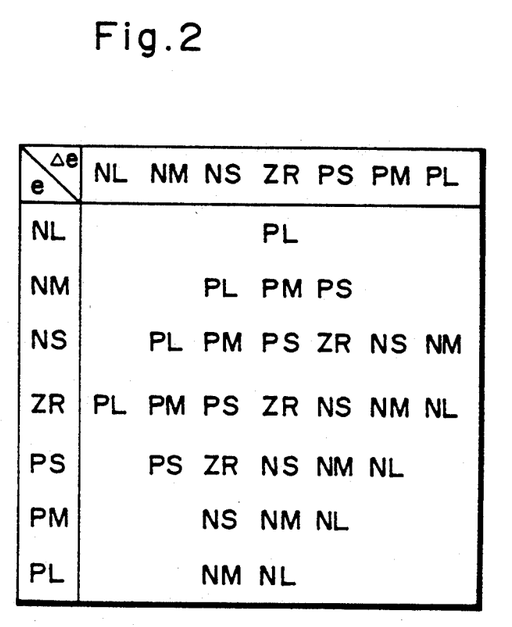
FIG. 2 illustrates an example of rules for fuzzy control.

FIG. 2 illustrates a table in which is set a change $\Delta U$ in a manipulated variable in rules created for each important combination of an error and the rate of change thereof. NL represents a negative large value, NM a negative medium value, NS a negative small value, ZR almost zero, PS a positive small value, PM a positive medium value, and PL a positive large value. For example, if e=NS and $\Delta e$=PS, namely if the controlled variable is a little smaller than the target value and is rising a little, then $\Delta U$ is decided in such a manner that $\Delta U$=ZR will hold, i.e., in such a manner that the manipulated variable will not change. In each rule, the error e, the rate of change $\Delta e$ of the error and the rate of change $\Delta U$ of the manipulated variable are evaluated using membership functions defined in advance.

Figure 3A:
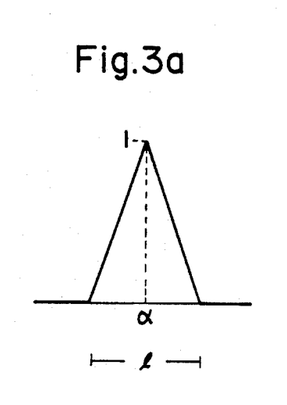
FIGS. 3a, 3b and 3c respectively illustrate the shapes of membership functions.
Figure 3B:
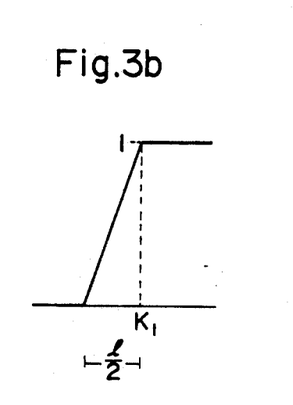
Figure 3C:
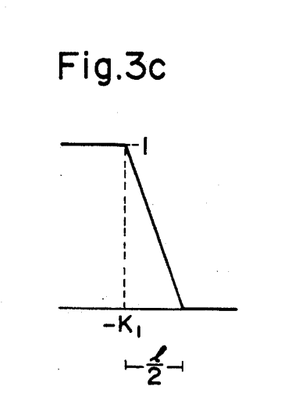

FIGS. 3a through 3c illustrate examples of membership functions related to the error e. FIG. 3a illustrates the shape common to PM, PS, ZR, NS and NM. The membership functions are isosceles triangles about a central value $\alpha$, in which the length of the base is 1 and the height (grade) of the apex is 1. The position of the central value $\alpha$ differs in dependence upon the type PM, PS . . . of membership function. FIG. 3b shows the membership function in the case of PL. In the region $e<K_1$, the shape is the same as in FIG. 3a, and the grade is 1 at $e \geq K_1$. FIG. 3c shows the membership function in case of NL. In the region $e>-K_1$, the shape is the same as in FIG. 3a, and the grade is 1 at $e \leq -K_1$.

Membership functions relating to the rate of change $\Delta e$ in the error and the rate of change $\Delta U$ in the manipulated variable are also of the same shapes as the membership functions of the error e shown in FIGS. 3a through 3c, but the parameters $\alpha$, 1, $K_1$, etc., are different. Of course, the membership functions can have any shape (e.g., trapezoidal or the shape of a normal distribution), not just the shape of an isosceles triangle.

Figure 4A:
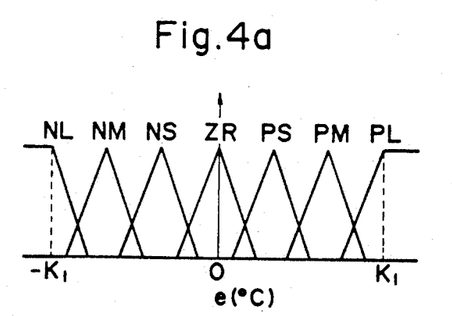
FIGS. 4a, 4b and 4c respectively illustrate membership functions of an error e, a rate of change $\Delta e$ thereof and a rate of change $\Delta U$ in a manipulated variable.
Figure 4B:
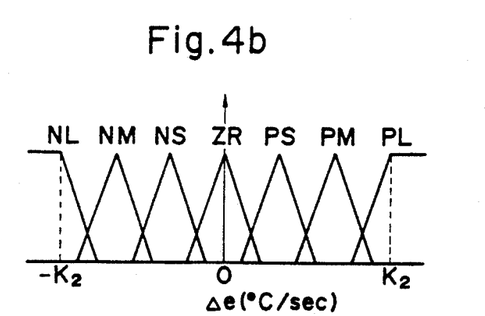
Figure 4C:
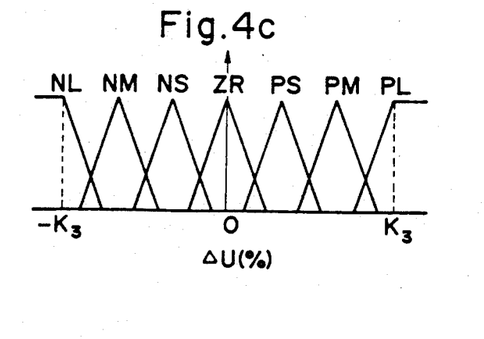

FIGS. 4a, 4b and 4c illustrate all of the membership functions relating to respective ones of e, $\Delta e$ and $\Delta U$. For example, in a case where temperature control of the controlled system is performed, the units are e (°C.), $\Delta e$ (°C./sec), and $\Delta U$ (%). $K_1$, $K_2$ and $K_3$ are adjustment parameters which determine the positions of the membership functions NL and PL. These parameters are tuned to suitable values based upon experience.

The procedure of fuzzy inferential reasoning will now be described with reference to FIGS. 5a, 5b, 5c and FIG. 6.

Figure 5A:
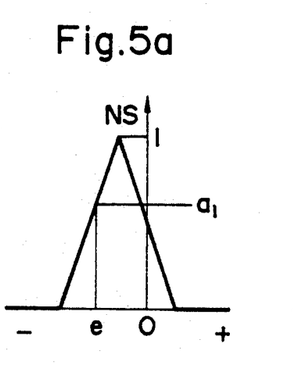
FIGS. 5a, 5b and 5c show a process for inferring the degree to which an input conforms to a rule.
Figure 5B:
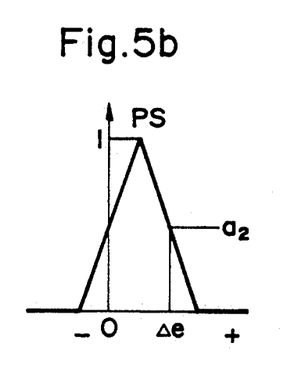
Figure 5C:
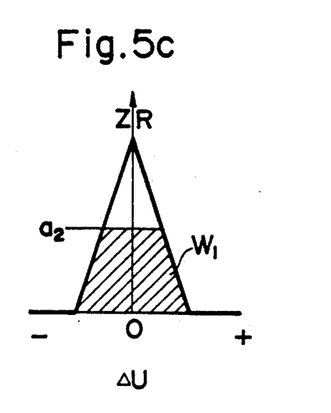

FIGS. 5a, 5b and 5c illustrate a processing procedure relating to the following rule: If e=NS and $\Delta e$=PS, then $\Delta U$=ZR. The degree of conformity of the measured error e to the membership function NS is found, and this is designated by $a_1$ (FIG. 5a). Similarly, the degree of conformity of the measured rate of change $\Delta e$ of the error e to the membership function PS is found, and this is designated by $a_2$ (FIG. 5b). These degrees of conformity $a_1$, $a_2$ are compared, and the smaller, namely $a_2$, is adopted as the degree of conformity of the rule (this is a MIN operation). Let $W_1$ (FIG. 5c) represent a trapezoidal portion obtained by cutting the membership function ZR of the rate of change $\Delta U$ in the manipulated variable at the height of the selected $a_2$. This computation of the degree of conformity and the operation with respect to $\Delta U$ using the computed degree of conformity are executed with regard to all rules to obtain trapezoidal portions $W_2 - W_n$ (where n is the number of rules) in each of the rules.

Figure 6:
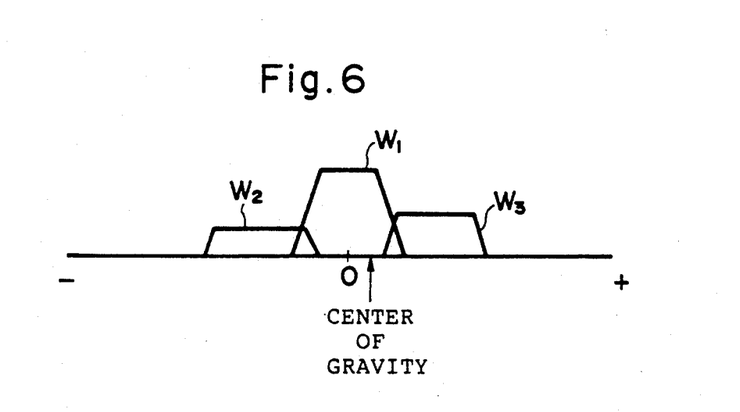
FIG. 6 shows a process for obtaining a definite output.

The trapezoidal portions $W_1 - W_n$ thus obtained in each of the rules are superimposed as shown in FIG. 6 (in which n=3) to obtain the position of the center of gravity thereof, and this is determined as being the rate of change $\Delta U$ of the manipulated variable. This rate of change $\Delta U$ is added to the immediately preceding manipulated variable to decide the presently prevailing manipulated variable U, which is delivered as an output.

In the conventional fuzzy control apparatus constructed as set forth above, the tuning parameters $K_1$, $K_2$, $K_3$ of the membership functions shown in FIGS. 4a, 4b and 4c must be adjusted in dependence upon the process under control. This adjustment must be performed by a skilled operator based upon experience. If the parameters are set at improper values, control performance will deteriorate.

Considering a case where the process is started up, the procedure followed is to enlarge the manipulated variable in the initial stage of operation where the controlled variable is much lower than the target value, reduce the manipulated variable if the controlled variable approaches the target value to a certain extent, and stabilize the manipulated variable at a certain constant value when the controlled variable and the target value coincide.

With regard to a process having a quick response, the manipulated variable must be reduced fairly early. If the manipulated variable is kept at its maximum value even when the controlled variable approaches the target value, overshoot will occur if the manipulated variable is subsequently reduced in sudden fashion. Consequently, the tuning parameters $K_1$, $K_2$ must be enlarged to make the limits within which NL, PL, etc., are decided depart from the target value. If $K_1$, $K_2$ are made small (since e, $\Delta e$ fluctuate by a wide margin with respect to the amount of change in the manipulated variable in a process with a quick response), the value of the error e oscillates between a value less than NL and a value greater than PL, and the rules which employ the membership functions (NS, ZR, PS, etc.) situated near the center can scarcely be used. This leads to the occurrence of overshoot and causes the phenomenon referred to as hunting.

With regard to a process having a slow response, it is necessary conversely to hold the manipulated variable at a maximum value near the target value. If the manipulated variable is reduced early, start-up becomes very slow. Consequently, it must be so arranged that the tuning parameters $K_1$, $K_2$ are made small and the membership functions are decided as being NL, PL, etc., until the controlled variable approximates the target value. If $K_1$, $K_2$ are made large, the rules which employ the membership functions (NL, PL, etc.) situated at both ends can scarcely be used and response deteriorates. This leads to a phenomenon in which the error never approaches zero.

A case will now be considered in which a process having a high steady gain (a parameter which represents how much the controlled variable will change when the manipulated variable is changed by 1%) and a process having a low steady gain are controlled.

Assuming that the target values of both processes are altered by the same value, it will suffice if the change in the manipulated variable is small in the case of the process having the high steady gain. Accordingly, the value of the parameter $K_3$ also should be small. If the value of parameter $K_3$ is set to be large, the manipulated variable will vary greatly and the overshoot and hunting phenomena will occur.

In the case of the process having the low steady gain, on the other hand, the manipulated variable must be changed by a large amount. Accordingly, it is required that the value of the parameter $K_3$ also be enlarged. If the value of parameter $K_3$ is set to be small, the manipulated variable changes only a little, response deteriorates and a phenomenon occurs in which the error never becomes zero.

Thus, though the setting of the parameters $K_1$, $K_2$, $K_3$ is very important, in the prior art the setting is made relying solely upon the experience of the operator and is deficient in terms of ease of use and universality.

DISCLOSURE OF THE INVENTION

The present invention seeks to provide a method of operating a fuzzy control apparatus by automatically setting ideal membership functions, inclusive of adjustment of the above-mentioned tuning parameters $K_1$, $K_2$, $K_3$, as well as an adjustment device in the fuzzy control apparatus.

An operating method in a fuzzy control apparatus according to the present invention is characterized in that, in a fuzzy control apparatus which presets plural types of membership functions with regard to respective ones of at least one type of input, which is derived based on a controlled variable obtained from a controlled system, and an output relating to a manipulated variable applied to the controlled system, and derives the output by performing a fuzzy inferential operation in accordance with predetermined control rules using the input and several of the set membership functions, the method comprises the steps of obtaining prescribed characteristic data of the controlled system based on the controlled variable and the manipulated valiable, obtained when the controlled system is controlled, and substantially correcting at least one membership function of at least one of the input or output in dependence upon the characteristic data.

An adjusting device in a fuzzy control apparatus according to the present invention is characterized in that, in a fuzzy control apparatus which presets plural types of membership functions with regard to respective ones of at least one type of input, which is derived based on a controlled variable obtained from a controlled system, and an output relating to a manipulated variable applied to the controlled system, and derives the output by performing a fuzzy inferential operation in accordance with predetermined control rules using the input and several of the set membership functions, the adjusting device comprises means for identifying the controlled system upon creating prescribed characteristic data of the controlled system based on the controlled variable, and the manipulated variable, obtained when the controlled system is controlled, and means for substantially adjusting at least one membership function of at least one of the input or output in dependence upon the characteristic data.

In accordance with the present invention, characteristic data which identifies the controlled system are measured and a substantial adjustment or correction of a membership function inclusive of adjustment of the above-mentioned tuning parameters is performed automatically based upon the characteristic data. Accordingly, the load upon the operator at the time of adjustment is alleviated and it is possible to readily deal with various controlled systems. The invention therefore excels in universality.

BRIEF DESCRIPTION OF THE DRAWINGS

FIGS. 5a through 5c and FIG. 6 illustrate an inferential reasoning process, in which

BEST MODE FOR CARRYING OUT THE INVENTION

Figure 7:
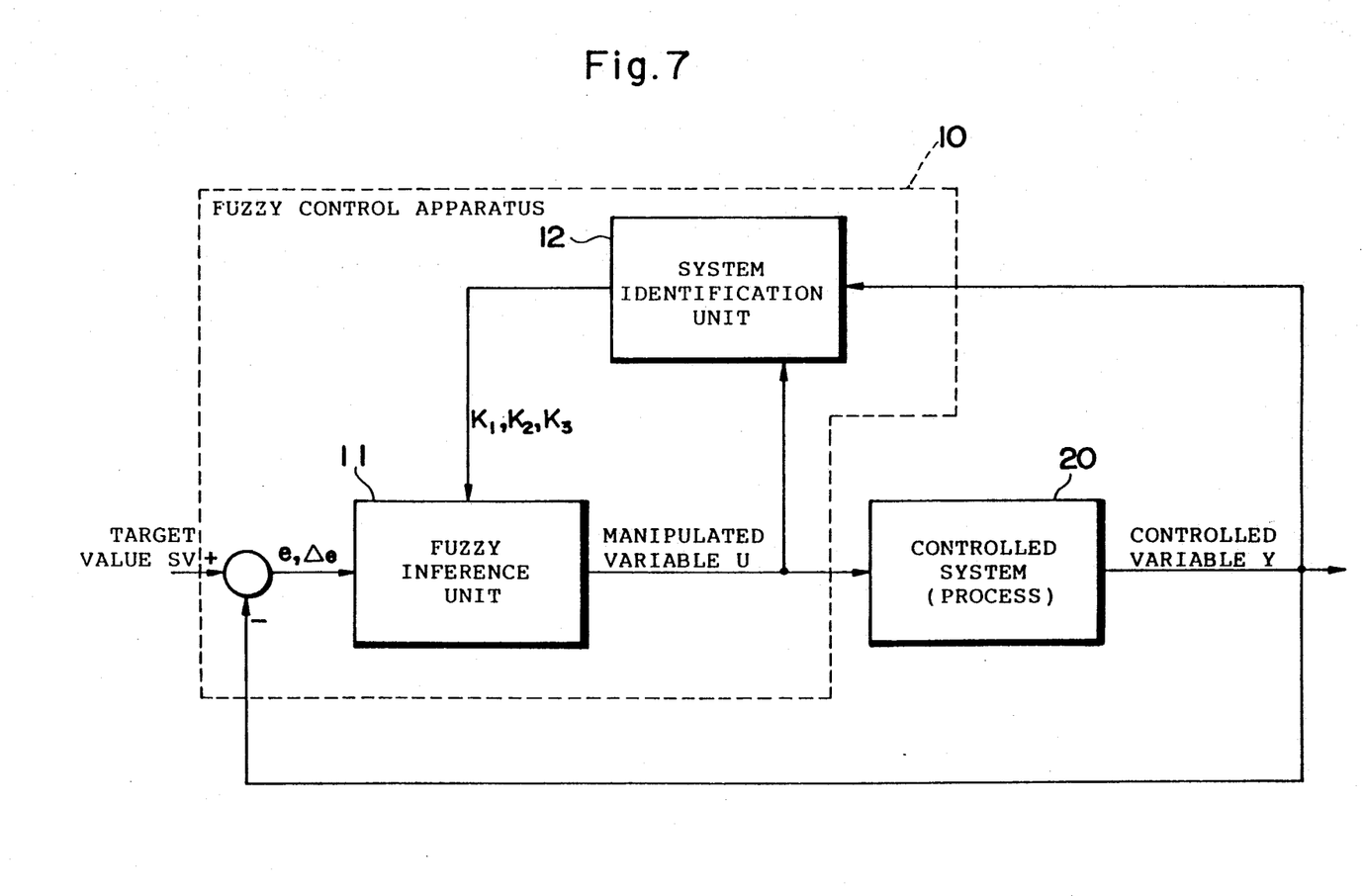
FIG. 7 is a block diagram showing an embodiment of the present invention.

FIG. 7 illustrates an embodiment of the present invention.

The fuzzy control apparatus 10 is provided with a system identification unit 12 in addition to the fuzzy inference unit 11. The fuzzy inference unit 11 has set membership functions that are in accordance with the rules of the kind shown in FIG. 2. The inputs are the error e and the rate of change $\Delta e$ thereof, in response to which the fuzzy inference unit performs fuzzy inferential reasoning in accordance with the above mentioned rules to generate an output U indicative of a definite manipulated variable. A controlled variable Y of the controlled system and the manipulated variable U outputted by the fuzzy inference unit 11 are applied to the system identification unit 12, which creates outputs, namely the tuning parameters $K_1$, $K_2$, $K_3$ in this embodiment, for correcting or adjusting the shape of a membership function. These are applied to the fuzzy inference unit 11.

The function of the system identification unit 12 will now be described with regard to an example in which the tuning parameters $K_1$, $K_2$, $K_3$ are decided.

The system identification unit 12 observes the manipulated variable U and the controlled variable Y and, based thereon, measures the characteristics of the process, namely maximum slope R, dead time L and steady gain K, in accordance with a step response method.

The tuning parameters $K_1$, $K_2$, $K_3$ are determined by the following equations using these measured values:

$$K_1 = C_1 \cdot R \cdot L \quad (1)$$

$$K_2 = C_2 \cdot R \quad (2)$$

$$K_3 = C_3 \cdot K \quad (3)$$

Here $C_1$, $C_2$, $C_3$ are constants which do not change regardless of the process. For example, these constants may be set as follows:

$C_1 = 100$ $C_2 = 1$ $C_3 = 1$

The width of the membership function of the error e is considered to correspond to the "proportional band" of PID control. Therefore, Eq. (1) is a practical application of a "proportional band" setting method. A method using the maximum slope R and dead time L has practical results in the Ziegler-Nichols method or Chien-Hrones-Reswick method, etc., which are methods for designing PID constants.

With regard to Eq. (2), namely the rate of change $\Delta e$ in the error, R is used since the slope representing the maximum value of $\Delta e$ is the maximum slope R.

When the parameters $K_1$, $K_2$, $K_3$ are thus decided, all of the membership functions, which are set in the fuzzy inference unit 11, relating to the error e, its rate of change $\Delta e$ and the rate of change $\Delta U$ in the manipulated variable are corrected in dependence upon the $K_1$, $K_2$, $K_3$ decided. Since the parameters $K_1$, $K_2$, $K_3$ represent width along the horizontal axis (a fuzzy variable), the peak position and slope of each membership function (where the peak position of the function ZR is invariable) are varied in dependence upon $K_1$, $K_2$, $K_3$ just as if the horizontal axis were shortened or lengthened. The membership functions are given concrete expression in various forms in dependence upon the type of fuzzy control apparatus. For example, in a case where the fuzzy control apparatus is realized by a programmed or special-purpose binary or multivalued digital computer or controller, the membership functions are such that their function values are stored in memory or the functions themselves are stored in memory in the form of arithmetic expressions. In such case, correction of membership functions is executed in a mode wherein the memory positions of the function values or the arithmetic expressions are altered. In a case where the fuzzy control apparatus is realized by a multivalued or analog-type electronic circuit, the correction of a membership function is carried out by changing the constants of the membership function circuit and membership function generator circuit incorporated within the electronic circuit. Of course, altering the parameters $K_1$, $K_2$, $K_3$ as in the foregoing embodiment is equivalent to varying the relative magnitudes of the inputs e, $\Delta e$ and output $\Delta U$. Accordingly, the correction can be realized also by compressing or expanding the values of these inputs and output. Substantially adjusting or correcting a membership function includes compressing or expanding an input in this fashion, namely processing for transforming the coordinates thereof.

Figure 8:
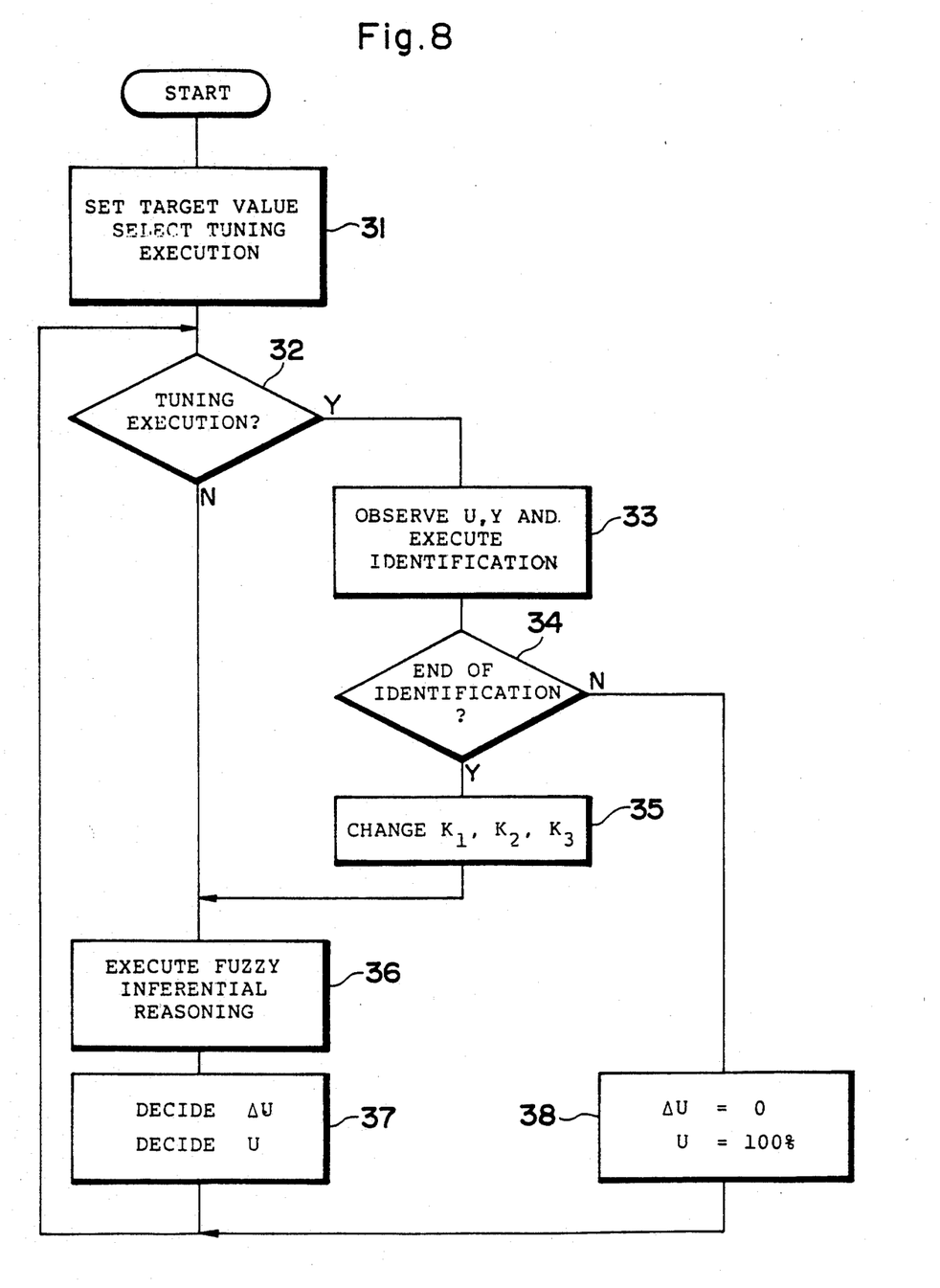
FIG. 8 is a flowchart showing the flow of the operation of the embodiment according to the present invention.

FIG. 8 illustrates the flow of the operation of the fuzzy control apparatus 10. Reference will be had to this drawing to simply describe the operation of the apparatus.

At the start of operation, the user sets a target value and makes a selection as to whether tuning is to be executed (step 31). Since the characteristics of the process are unknown at initial start-up, the parameters $K_1$, $K_2$, $K_3$ will have been set at mean values. For this reason, tuning is necessary. In a case where the parameters $K_1$, $K_2$, $K_3$ have already been set at appropriate values by the last tuning operation, tuning will be unnecessary.

In a case where tuning execution has been selected (YES at step 32), the system identification unit 12 observes the manipulated variable U and the controlled variable Y by the step-response method, as described above, and identifies these variables (step 33). During the system identification, $\Delta U = O$ and U is held at a constant value (e.g., 100%) (step 38).

In a case where tuning execution is not selected (NO at step 32), the fuzzy inference unit 11 observes the error e and its rate of change $\Delta e$, an inferential reasoning operation similar to that described in the section on background art is performed, the rate of change $\Delta U$ in the manipulated variable is decided, and this is added to the preceding manipulated variable U to decide the presently prevailing manipulated variable U (steps 36, 37).

For example, since e is negative at the time of start-up, e=NL, NM or NS in the table of FIG. 2 applies, and $\Delta e$=ZR. Therefore, the manipulated variable U is increased in accordance with these rules. As the controlled variable approaches the target value, a transition is made to the rules e=NM or NS, $\Delta e$=PM or PL, etc, and the manipulated variable starts to decrease. When the controlled variable coincides with the target value, the manipulated variable U is set, without being changed, in accordance with the rules e=ZR, Δe=ZR.

The processing of steps 32, 36, 37 or steps 32, 33, 34, 38 is repeatedly executed. When identification ends (when R, L and K are decided), the parameters $K_1$, $K_2$, $K_3$ are altered based thereon and tuning is terminated (step 35).

After the parameters $K_1$, $K_2$, $K_3$ have been set at appropriate values by the foregoing operation, control best suited to the controlled system can be executed.

In the embodiment described above, the step-response method is used in system identification. However, the identification method is not limited to this method and system identification can be carried out in the same manner using another method, such as a limited cycle method or method of least squares.

The expressions for determining the parameters $K_1$, $K_2$ also are not limited to those using R and L. It is possible to determine the parameters based on other identified values, e.g., time constant or steady gain.

Furthermore, the determination of the parameter $K_3$ also is not limited to an expression using gain K. For example, the parameter can be decided based on another identified value, e.g., maximum slope, dead time, time constant, etc.

INDUSTRIAL APPLICABILITY

The operating method and adjusting device in a fuzzy control apparatus according to the present invention are applied to a fuzzy control apparatus for performing fuzzy inferential reasoning in accordance with predetermined control rules and deriving an output related to a manipulated variable to be applied to a controlled system. The method and device are utilized in automatic control of temperature and velocity.

What is claimed is:

1. An apparatus for adjusting a fuzzy inference unit which controls a manipulated variable of a controlled system to thereby affect a controlled variable of said system, said apparatus comprising:

a fuzzy inference unit for performing an inference operation on at least one applied input signal related to said controlled system in accordance with predetermined control rules and at least some membership functions of set plural types of membership functions and producing a control signal for control of said manipulated variable, said membership functions having at least one associated adjustable tuning parameter which determines a range over which said set membership functions are operative for each of said plural types of membership functions;

a controlled system receiving said control signal and adjusting said manipulated variable in response thereto, said controlled system producing an output signal representing a value of said controlled variable;

a system identification unit, responsive to said control and output signals when said controlled system is being controlled, for obtaining data identifying characteristics of the controlled system and for producing an adjustment signal based on said identifying data; and said fuzzy inference unit including an adjusting device for adjusting said tuning parameters of said membership functions in accordance with said adjustment signal, wherein adjustment of said tuning parameter causes compression or expansion of the values of inputs or outputs related to said set membership functions.

2. An apparatus as in claim 1, wherein said identifying characteristics related to the maximum slope, dead time and steady gain of said controlled system.

3. An apparatus as in claim 1, wherein said at least one applied input includes at least: (a) an error signal taken as a difference between said output signal representing said controlled variable and a signal representing a prescribed set value for said controlled variable, and (b) a signal representing a rate of change of said error signal.

4. An apparatus as in claim 3, wherein said fuzzy logic unit contains membership functions for each of said error signal, the signal representing a rate of change of said error, and a rate of change of said manipulated variable.

5. A method for adjusting a fuzzy inference unit which controls a manipulated variable of a controlled system to thereby affect a controlled variable of said system, said method comprising the steps of:

performing a fuzzy inference operation on at least one applied input signal related to said controlled system in accordance with predetermined control rules and at least some of membership functions of set plural types of membership functions to produce a control signal for controlling said manipulated variable, said membership functions having at least one associated adjustable tuning parameter which determines a range over which said set membership functions are operative for each of said plural types of membership functions;

monitoring said control signal and an output signal of said system representing said controlled variable during a time said system is controlled to obtain data identifying characteristics of said controlled system, and for producing an adjustment signal based on said identifying data; and, adjusting said tuning parameters of said membership functions in accordance with said adjustment signal, wherein adjustment of said tuning parameters causes compression or expansion of the values of inputs or outputs related to said set membership functions.

6. A method as in claim 5, wherein said identifying characteristics relate to the maximum slope, dead time and steady gain of said controlled system.

7. A method as in claim 5, wherein said at least one applied input signal includes at least: (a) an error signal taken as a difference between said output signal of said controlled system representing said controlled variable and a signal representing a prescribed set value, and (b) a signal representing a rate of change of said error signal.

8. A method as in claim 7, wherein said fuzzy logic unit contains membership functions for each of said error signal, the signal representing a rate of change of said error signal and a rate of change of said manipulated variable.

* * * * *